(12) United States Patent
Phillips

(10) Patent No.: US 8,770,367 B2
(45) Date of Patent: Jul. 8, 2014

(54) PASSIVE MECHANICAL LAUNCH DEVICE

(75) Inventor: Andrew W. Phillips, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 612 days.

(21) Appl. No.: 12/962,867

(22) Filed: Dec. 8, 2010

(65) Prior Publication Data

US 2012/0085617 A1    Apr. 12, 2012

Related U.S. Application Data

(60) Provisional application No. 61/392,075, filed on Oct. 12, 2010.

(51) Int. Cl.
*F16D 43/10*    (2006.01)

(52) U.S. Cl.
USPC ............... 192/105 C; 192/52.4; 192/70.11

(58) Field of Classification Search
USPC ............... 192/52.5, 105 C, 52.4, 103 A
See application file for complete search history.

(56) References Cited

U.S. PATENT DOCUMENTS

| | | | |
|---|---|---|---|
| 1,793,735 A * | 2/1931 | De La Mater | 192/105 C |
| 1,813,638 A * | 7/1931 | Rawson | 192/105 C |
| 5,284,234 A * | 2/1994 | Miglizzi | 192/105 C |
| 5,409,428 A | 4/1995 | Antonov | |

* cited by examiner

*Primary Examiner* — David D Le
*Assistant Examiner* — Ryan Dodd
(74) *Attorney, Agent, or Firm* — Quinn Law Group, PLLC

(57) ABSTRACT

A device is provided that includes a torque-transmitting mechanism selectively engageable by radially-outward force to transfer torque between a rotatable input member and a rotatable output member. A mass is connected for rotation with the output member and is configured to move radially outward as the output member rotates to reduce torque transfer from the input member to the output member as the speed of the output member approaches the speed of the input member. Furthermore, the mass connected for rotation with the output member may create a force that causes torque transfer between the input member and the output member when the output member rotates faster than the input member.

10 Claims, 3 Drawing Sheets

PASSIVE MECHANICAL LAUNCH DEVICE

CROSS-REFERENCE TO RELATED APPLICATIONS

This application claims the benefit of U.S. Provisional Application Ser. No. 61/392,075 filed on Oct. 12, 2010, which is hereby incorporated by reference in its entirety.

TECHNICAL FIELD

The invention relates to a device selectively engageable by radially-outward force, and specifically for improving the launch of a vehicle.

BACKGROUND

Delivery of tractive force to vehicle wheels must be accomplished as smoothly as possible. For example, launching a vehicle to provide tractive force at the vehicle wheels should be done without abrupt changes in torque that will be noticeable to the vehicle occupants. A fluid coupling such as a torque converter may be used to provide such a "soft-lockup" launch. Torque converters are relatively large, and require a hydraulic supply to operate.

Limited slip differentials allow some angular velocity, also referred to as slip, between vehicle wheels, but lockup at a predetermined slip. A smooth lockup of the limited slip differential will smooth torque spikes to improve passenger comfort.

Traditional clutches have masses attached rotationally to the input member, so that as engine speed rises, so does the torque capacity of the clutch. Such traditional clutches have low torque capacity at idle stall (as engine speed is low). However, these clutches retain high torque capacity when locked, making engagement, disengagement, and shifts noticeable to vehicle passengers unless additional measures are taken to control torque spikes.

SUMMARY

A device is provided that includes a torque-transmitting mechanism selectively engageable by radially-outward force to transfer torque between a rotatable input member and a rotatable output member. A mass is connected for rotation with the output member and is configured to move radially outward as the output member rotates to reduce torque transfer from the input member to the output member as the speed of the output member approaches the speed of the input member. Furthermore, the mass connected for rotation with the output member may create a force that causes torque transfer between the input member and the output member when the output member rotates faster than the input member to brake the output member. The device provides a fluid-coupling like launch feel, unlike a hard lockup of a simple device. Because the launch device is a passive device (i.e., it does not require electronic or hydraulic control), the device may be marginally less expensive than a torque converter. It may also be lighter and smaller. If used in a passive, limited slip differential, then the launch device may provide a faster, more consistent performance than a gerotor pump system, as a hydraulic supply and the buildup of hydraulic pressure is not necessary.

The above features and advantages and other features and advantages of the present invention are readily apparent from the following detailed description of the best modes for carrying out the invention when taken in connection with the accompanying drawings.

DETAILED DESCRIPTION

Figure 1:
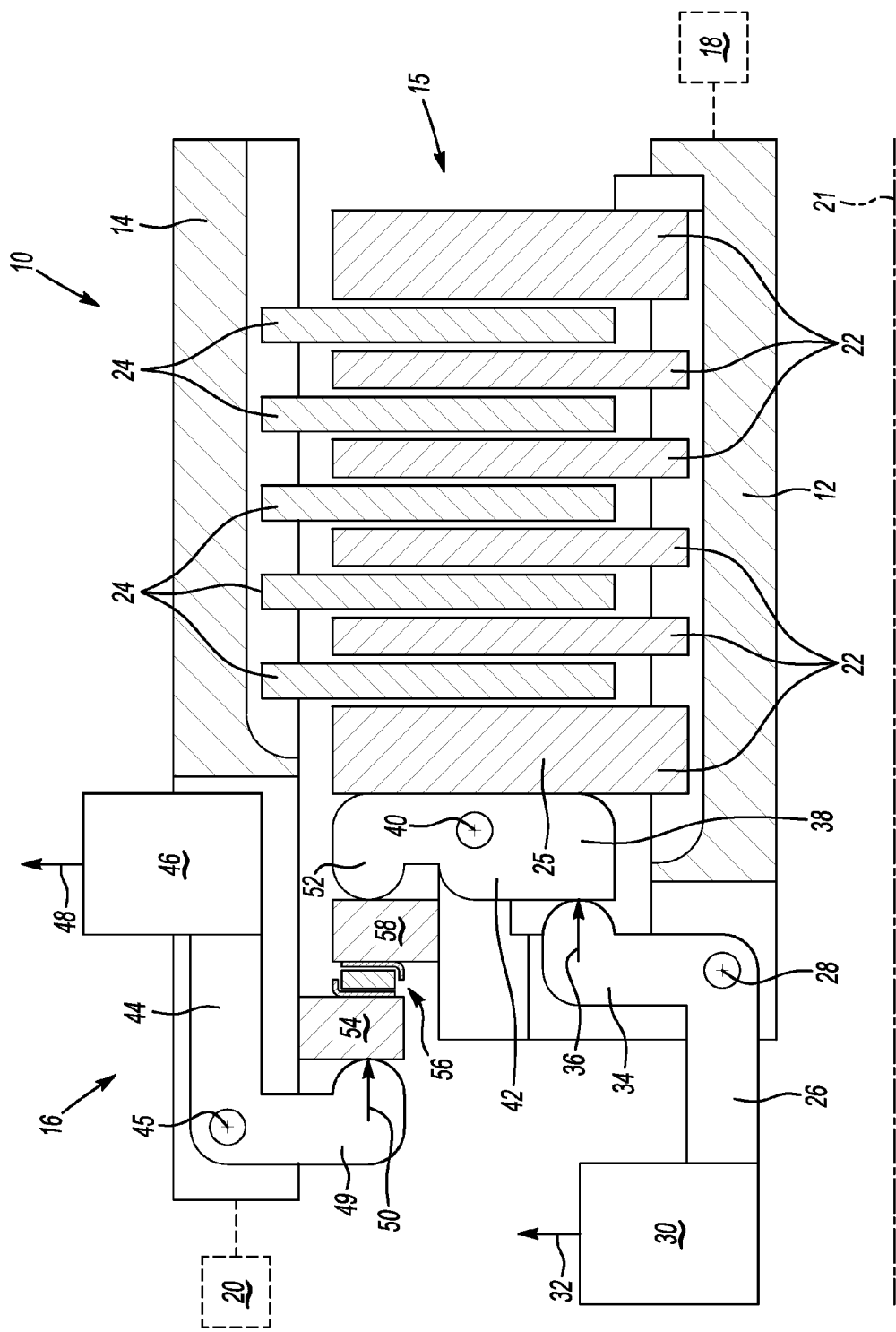
FIG. 1 is a schematic illustration in partial cross-sectional view of a first embodiment of a vehicle launch device in a vehicle powertrain.

Referring the drawings, wherein like reference numbers refer to like components throughout the several views, FIG. 1 shows a launch device 10 configured to passively transmit torque between a rotatable input member 12 and a rotatable output member 14 of a torque-transmitting mechanism, referred to herein as a clutch 15, with a torque capacity that decreases as a difference between the speed of rotation of the input member 12 and the speed of rotation of the output member 14 decreases. The launch device 10 is shown incorporated in a vehicle powertrain 16, but it may also be implemented in other applications. The input member 12 is connected with a first powertrain component 18, such as an engine, and the output member 14 is connected with a second powertrain component 20, such as a transmission input member. Alternatively, the first powertrain component 18 could be a transmission output member and the second powertrain component 20 could be a final drive member connected between the transmission and vehicle wheels.

Both the input member 12 and the output member 14 rotate about an axis of rotation 21. The output member 14 is positioned radially outward of the input member 12 in FIG. 1. Only a portion of the input member 12 and a portion of the output member 14 are shown in schematic cross-sectional view; however, both are generally annular.

Plates 22 are connected for rotation with the input member 12. The plates 22 are referred to as a first set of plates, and are interleaved with plates 24 that are connected for rotation with the output member 14. The plates 24 are referred to as a second set of plates. One of the plates 22 is an apply plate 25 that is axially movable to force the plates 22, 24 into contact with one another, creating torque capacity across the clutch 15 and torque transmission between the input member 12 and the output member 14.

A first member member 26 is pivotally connected for rotation with the input member 12 at pivot 28 with a pivot pin or other suitable fastener. The first member 26 is configured with a first mass 30. When the input member 12 rotates about the axis of rotation 21, radially-outward force 32 moves the mass 30 radially outward so that the first centripetal member 26 pivots clockwise from the position shown in FIG. 1. This causes an arm portion 34 of the first member 26 to apply a force 36 in an axial direction against an apply member 38. In this embodiment, the apply member 38 is referred to as rocker 38. Although a rocker design is used in this embodiment, other mechanisms that engage by radially-outward force, such as a ball and ramp, may be used. The rocker 38 is pivotally connected to the input member 12 at pivot point 40. When the arm portion 34 applies force 36 to an inner portion 42 of the rocker 38, the rocker 38 may pivot about pivot point 40, moving in a counterclockwise direction, and the force 36 is transferred to the apply plate 25 of the first set of plates 22. The apply plate 25 is the leftmost plate 22 in FIG. 1. If force 36 is sufficiently large and is not counteracted by an opposing force as discussed below, the apply plate 25 moves axially to engage the plates 22 with the plates 24. The force 36 increases as the rotational speed of the input member 12 increases. Although only one rocker 38 and one pair of members 26, 44 are shown, there would be at least one other rocker 38 with members 26, 44 spaced circumferentially between the input member 12 and the output member 14. In some embodiments, there would be three or more rockers 38 with corresponding centripetal members 26, 44 spaced about the axis of rotation 21.

When the plates 22 and 24 are engaged, torque is transferred from the input member 12 to the output member 14, causing the output member 14 to begin rotating. A second member member 44 is pivotally connected for rotation with the output member 14 at pivot 45 with a pivot pin or other suitable fastener. The second member 44 is configured with a second mass 46. When the output member 14 rotates about the axis of rotation 21, radially-outward force 48 moves the second mass 46 radially outward so that the second member 44 pivots counter clockwise from the position shown in FIG. 1. This causes an arm portion 49 of the second member 44 to apply a second axial force 50 in an axial direction against an outer portion 52 of the rocker 38. The second axial force 50 causes the rocker 38 to rotate in a clockwise direction, and increases as the rotational speed of the output member increases.

The second axial force 50 is applied to the rocker 38 through a first generally annular member 54, a bearing 56, and a second generally annular member 58. The first generally annular member 54 is an axial ring that is press-fit to rotate with the output member 14 and be slidable axially within a groove at the radially-inner surface of the output member 14. The first generally annular member 54 provides a consistent interface between the arm portion 49 and the bearing 56. The second generally annular member 58 is also an axial ring that is press-fit to rotate with the input member 12 and to be slidable axially within a groove at the radially-outer surface of the input member 12. The second generally annular member 58 provides a consistent interface between the outer portion 52 of the rocker 38 and the bearing 56.

The forces 36 and 50 create opposing rotational moments on the rocker 38. When the forces 36 and 50 are equal, the rocker 38 will be in the neutral position shown in FIG. 1, with the first set of plates 22 not engaged with the second set of plates 24, and no torque being transmitted through the torque-transmitting mechanism 15. The device 10 may be designed so that the rocker 38 will be in the neutral position shown when the speed of the output member 14 is equal to the speed of the input member 12. Alternatively, the members 26, 44 and masses 30, 46 may be designed so that the resulting forces 36, 50 cause the rocker 38 to be pivoted slightly either clockwise or counterclockwise so that the torque-transmitting mechanism 15 has some torque capacity when the speeds of the input member 12 and the output member 14 are synchronous.

If the forces 36 and 50 are not equal, the rocker 38 is pivoted away from the neutral position shown in FIG. 1 so that the torque-transmitting mechanism 15 has torque capacity. If the first powertrain component 18 is an engine, then the device 10 provides engine braking when force 50 is greater than force 36. So-called "engine braking" uses engine friction to restrain the speed of the vehicle in a coasting situation, such as when heading down a steep hill. This reduces or eliminates the need to apply the brakes to maintain a safe speed. An ordinary clutch does not guarantee engine braking because, regardless of speed of the output member, such an ordinary clutch provides torque capacity between the input member and the output member only if the input is already spinning fast enough to overcome any springs restraining the masses (i.e., usually faster than idle speed). Thus, if the vehicle is coasting down a hill in neutral, in order to provide engine braking, the vehicle operator must not only engage drive, but paradoxically depress the throttle so that the clutch can "latch on." The launch devices 10, 110, 210 described herein ensure engine braking availability regardless of the initial speed of the first powertrain component 18, 118, 218, such as the engine. Generally, as a difference in the magnitudes of the forces 36, 50 increases, the torque capacity of the clutch 15 increases.

Figure 2:
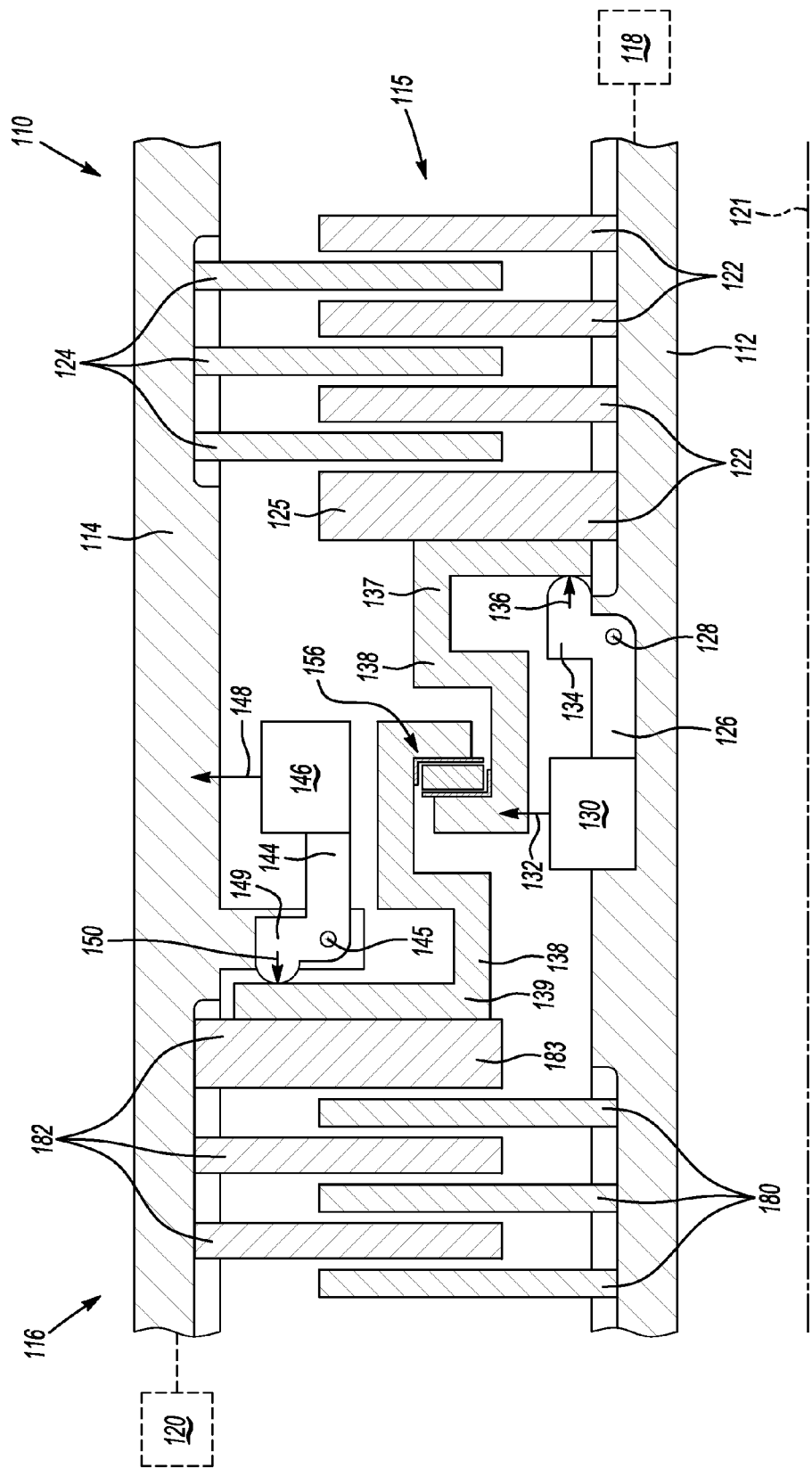
FIG. 2 is a schematic illustration in partial cross-sectional view of a second embodiment of a vehicle launch device in a vehicle powertrain.

FIG. 2 shows another embodiment of a launch device 110 that is configured to passively transmit torque between a rotatable input member 112 and a rotatable output member 114 of a torque-transmitting mechanism, referred to herein as a clutch 115, with a torque capacity that decreases as a difference between the speed of rotation of the input member 112 and the speed of rotation of the output member 114 decreases. The launch device 110 is shown incorporated in a vehicle powertrain 116, but it may also be implemented in other applications. The input member 112 is connected with a first powertrain component 118, such as an engine, and the output member 114 is connected with a second powertrain component 120, such as a transmission input member. Alternatively, the first powertrain component 118 could be a transmission output member and the second powertrain component 120 could be a final drive member connected between the transmission and vehicle wheels.

Both the input member 112 and the output member 114 rotate about an axis of rotation 121. The output member 114 is positioned radially outward of the input member 112 in FIG. 2. Only a portion of the input member 112 and a portion of the output member 114 are shown in schematic cross-sectional view; however, both are generally annular.

Plates 122 are connected for rotation with the input member 112. The plates 122 are referred to as a first set of plates, and are interleaved with plates 124 that are connected for rotation with the output member 114. The plates 124 are referred to as a second set of plates. One of the plates 122 is an apply plate 125 that is axially movable to force the plates 122, 124 into contact with one another, creating torque capacity across the clutch 115 and torque transmission between the input member 112 and the output member 114.

A first member member 126 is pivotally connected for rotation with the input member 112 at pivot 128 with a pivot pin or other suitable fastener. The first member 126 is configured with a first mass 130. When the input member 112 rotates about the axis of rotation 121, radially-outward force 132 moves the mass 130 radially outward so that the first member 126 pivots clockwise from the position shown in FIG. 2. This causes an arm portion 134 of the first member 126 to apply an axial force 136 in an axial direction against an apply member 138. In this embodiment, the apply member 138 is a two-piece sliding piston 138. The two-piece sliding piston 138 has a first portion 137 connected with the apply plate 125 for rotation with the input member 112, and axially slidable with respect to the input member 112. The sliding piston 138 also has a second portion 139 that is operatively connected with the first portion 137 through a bearing 156.

A second member member 144 is pivotally connected for rotation with the output member 114 at pivot 145 with a pivot pin or other suitable fastener. The second member 144 is configured with a second mass 146. A third set of plates includes plates 180 connected for rotation with the input member 112. A fourth set of plates includes plates 182 connected for rotation with the output member 114 and interleaved with the plates 182. One of the plates 182 is an apply plate 183 that is axially movable to force the plates 180, 182 into contact with one another, creating torque capacity across the clutch 115 and torque transmission between the input member 112 and the output member 114. Although only one pair of centripetal members 126, 144 with masses 130, 146 are shown, there would be at least one other pair of members 126, 144 with masses 130, 146 spaced circumferentially between the input member 112 and the output member 114. In some embodiments, there may be three or more pairs of members 126, 144 with masses 130, 146.

When the arm portion 134 applies force 136 to the first portion 137 of the piston 138, the force 136 is transferred to the apply plate 125 of the first set of plates 122. If force 136 is sufficiently large and is not counteracted by an opposing force as discussed below, the force 136 will move the apply plate 125 axially to engage the plates 122 with the plates 124. The force 136 increases as the rotational speed of the input member 112 increases.

Similarly, when the output member 114 rotates about the axis of rotation 121, radially-outward force 148 moves the mass 146 radially outward so that the second member 144 pivots counterclockwise from the position shown in FIG. 2 about pivot 145. This causes an arm portion 149 of the second member 144 to apply an axial force 150 in an axial direction against the second portion 139 of the piston 138. The force 150 is in a direction opposite from the force 136. If the force 150 is larger than the force 136, the apply plate 183 will move axially to engage the plates 182 with the plates 180. This would cause braking of the output member 114 (and the first powertrain component 118, such as an engine). The force 150 increases as the rotational speed of the output member 114 increases. The difference in speeds of the input member 112 and the output member 114 as well as the relative masses 130, 146 determine whether the resultant force (the difference between the forces 136 and 150) will be zero when the speed of the input member 112 is equal to the speed of the output member 114, or will be a positive force on the first portion 137, so that the clutch 115 has some torque capacity when the speeds of the input member 112 and the output member 114 are synchronous.

Figure 3:
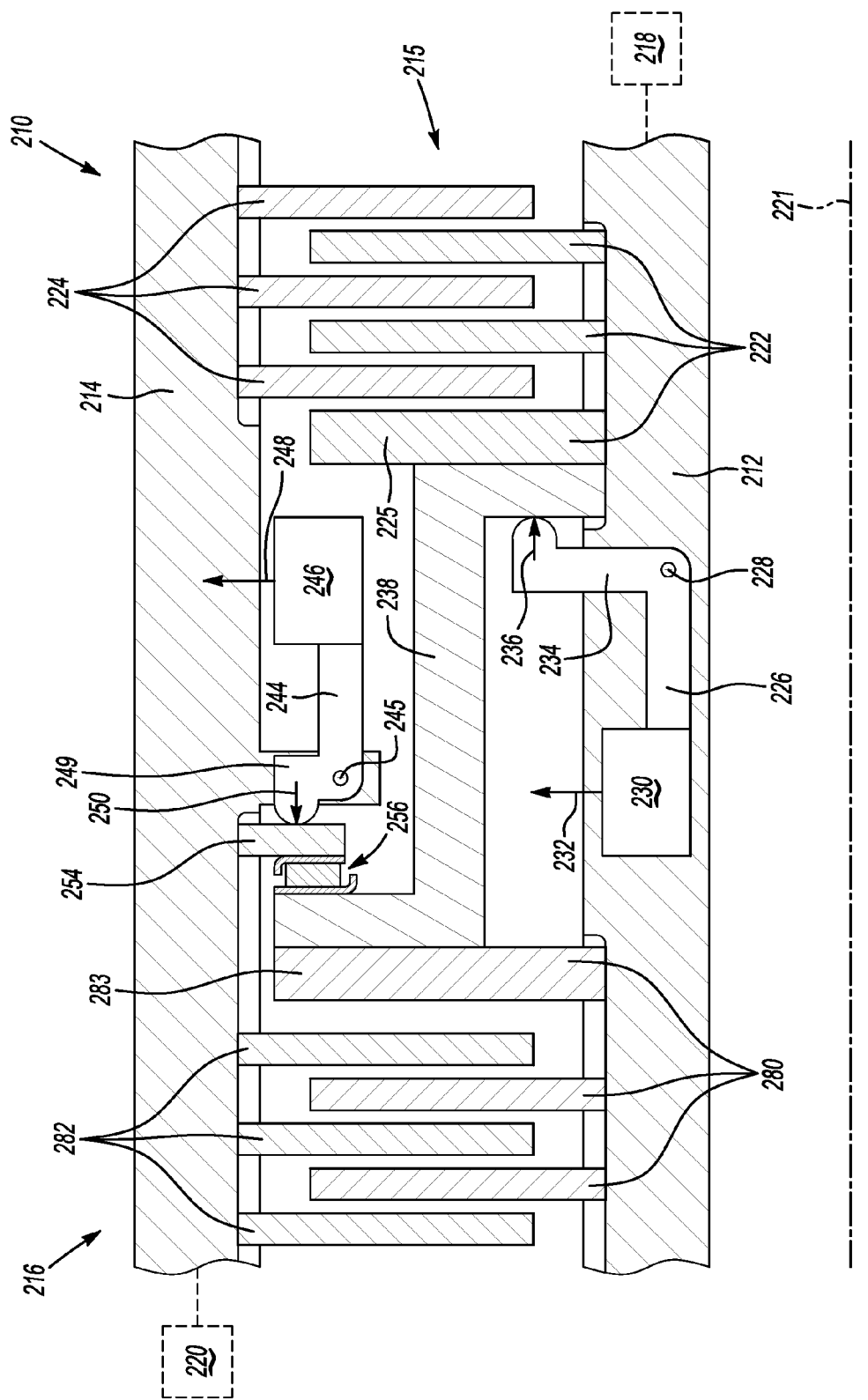
FIG. 3 is a schematic illustration in partial cross-sectional view of a third embodiment of a vehicle launch device in a vehicle powertrain.

FIG. 3 shows another embodiment of a launch device 210 that is configured to passively transmit torque between a rotatable input member 212 and a rotatable output member 214 of a torque-transmitting mechanism, referred to herein as a clutch 215, with a torque capacity that decreases as a difference between the speed of rotation of the input member 212 and the speed of rotation of the output member 214 decreases. The launch device 210 is shown incorporated in a vehicle powertrain 216, but it may also be implemented in other applications. The input member 212 is connected with a first powertrain component 218, such as an engine, and the output member 214 is connected with a second powertrain component 220, such as a transmission input member. Alternatively, the first powertrain component 218 could be a transmission output member and the second powertrain component 220 could be a final drive member connected between the transmission and vehicle wheels.

Both the input member 212 and the output member 214 rotate about an axis of rotation 221. The output member 214 is positioned radially outward of the input member 212 in FIG. 3. Only a portion of the input member 212 and a portion of the output member 214 are shown in schematic cross-sectional view; however, both are generally annular.

Plates 222 are connected for rotation with the input member 212. The plates 222 are referred to as a first set of plates, and are interleaved with plates 224 that are connected for rotation with the output member 214. The plates 224 are referred to as a second set of plates. One of the plates 222 is an apply plate 225 that is axially movable to force the plates 222, 224 into contact with one another, creating torque capacity across the clutch 215 and torque transmission between the input member 212 and the output member 214.

A first member member 226 is pivotally connected for rotation with the input member 212 at pivot 228 with a pivot pin or other suitable fastener. The first member 226 is configured with a first mass 230. When the input member 212 rotates about the axis of rotation 221, radially-outward force 232 moves the mass 230 radially outward so that the first member 226 pivots clockwise from the position shown in FIG. 3. This causes an arm portion 234 of the first member 226 to apply an axial force 236 in an axial direction against an apply member 238. In this embodiment, the apply member 238 is referred to herein as a sliding piston 238. The sliding piston 238 is connected for rotation with the apply plate 225 and with the input member 212, and is axially slidable with respect to the input member 212.

A second member, referred to herein as a second member 244, is pivotally connected for rotation with the output member 214 at pivot 245 with a pivot pin or other suitable fastener. The second member 244 is configured with a second mass 246. A third set of plates includes plates 280 are connected for rotation with the input member 212. One of the plates 280 of the third set of plates is an apply plate 283 that is axially movable to force the plates 280, 283 into contact with one another, creating torque capacity across the clutch 215 and torque transmission between the input member 212 and the output member 214. A fourth set of plates includes plates 282 connected for rotation with the output member 214 and interleaved with the plates 282. Although only one pair of members 226, 244 with masses 230, 246 are shown, there would be at least one other pair of members 226, 244 with masses 230, 246 spaced circumferentially between the input member 212 and the output member 214. In some embodiments, there may be three or more pairs of members 226, 244 with masses 230, 246.

When the arm portion 234 applies force 236 to the piston 238, the force 236 is transferred to the apply plate 225 of the first set of plates 222. If force 236 is sufficiently large and is not counteracted by an opposing force as discussed below, the force 236 will move the apply plate 225 axially to engage the plates 222 with the plates 224. The force 236 increases as the rotational speed of the input member 212 increases.

Similarly, when the output member 214 rotates about the axis of rotation 221, radially-outward force 248 moves the mass 246 radially outward so that the second member 244 pivots counterclockwise from the position shown in FIG. 3 about pivot 245. This causes an arm portion 249 of the second member 244 to apply an axial force 250 in an axial direction against the piston 238 through a sliding generally annular member 254 and a bearing 256 positioned between the arm portion 249 and the piston 238. The generally annular member 254 is an axial ring that is press-fit to rotate with the output member 214 and is slidable axially within a groove at the radially-inner surface of the output member 214.

The force 250 is in a direction opposite from the force 236. If the force 250 is larger than the force 236, the piston 238 will move axially to the left on FIG. 3, causing plate 283 to move axially and engage the plates 282 with the plates 280. This would cause braking of the output member 214 (and the first powertrain component 218, such as an engine). The force 250 increases as the rotational speed of the output member 214 increases. The difference in speeds of the input member 212 and the output member 214 as well as the relative masses 230, 246 determine whether the resultant force (the difference between the forces 236 and 250) will be zero when the speed of the input member 212 is equal to the speed of the output member 214, or will be a positive axial force to the right in FIG. 3, so that the clutch 215 has some torque capacity when the speeds of the input member 212 and the output member 214 are synchronous.

The launch devices 10, 110, 210 described above utilize radially-outward force to passively and mechanically control torque transfer between an input member and an output member without the use of electronic or hydraulic controls. Further, by utilizing a radially-outward moving mass on the output member, braking of the output member is automatically accomplished when the output member rotates faster than the input member.

While the best modes for carrying out the invention have been described in detail, those familiar with the art to which this invention relates will recognize various alternative designs and embodiments for practicing the invention within the scope of the appended claims.

The invention claimed is:

1. A device comprising:
  a torque-transmitting mechanism selectively engageable by radially-outward force to transfer torque between a rotatable input member and a rotatable output member;
  a mass connected for rotation with the output member;
  another mass connected for rotation with the input member and configured to move radially outward as the speed of the input member increases and thereby causing a first axial force on the torque-transmitting mechanism;
  a rocker connected at a pivot to one of the input member and the output member;
  wherein said mass is configured to move radially outward as the output member rotates to cause a second axial force that reduces torque transfer from the input member to the output member as the speed of the output member approaches the speed of the input member;
  wherein the first axial force is applied to the torque-transmitting mechanism through the rocker and causes the rocker to rotate in a first rotational direction about the pivot; and wherein the second axial force is applied to the torque-transmitting mechanism through the rocker and causes the rocker to rotate about the pivot in a second rotational direction opposing the first rotational direction.

2. The device of claim 1, wherein the torque-transmitting mechanism further includes
  a first set of plates connected for rotation with the input member;
  a second set of plates connected for rotation with the output member; and
  wherein the rocker is positioned adjacent the sets of plates and configured to move toward the sets of plates to cause torque transfer between the input member and the output member.

3. The device of claim 2, wherein the first axial force acts on the sets of plates when said another mass moves radially outward; wherein the rocker is adjacent the first set of plates.

4. The device of claim 3, further comprising:
  a bearing positioned between the second member and the rocker so that the second axial force is applied to the rocker through the bearing;
  a first generally annular member positioned between the second member and the bearing and configured to slide axially with respect to the output member; and
  a second generally annular member positioned between the bearing and the rocker and configured to slide axially with respect to the input member.

5. A device for controlling torque transfer between an input member and an output member comprising:
  a first set of plates connected for rotation with the input member;
  a second set of plates connected for rotation with the output member;
  a first member pivotally connected for rotation with the input member and configured with a first mass so that the first member applies a first axial force on the first set of plates to engage the first set of plates with the second set of plates as a radially-outward force pivots the first member to move the first mass when the input member rotates, the first axial force increasing as the rotational speed of the input member increases;
  a second member pivotally connected for rotation with the output member and configured with a second mass so that the second member applies a second axial force as a radially-outward force pivots the second member to move the second mass when the output member rotates, the second axial force increasing as the rotational speed of the output member increases;
  a rocker connected at a pivot to one of the input member and the output member adjacent the first set of plates;
  wherein the first axial force is applied to the first set of plates through the rocker and causes the rocker to rotate in a first rotational direction about the pivot; and
  wherein the second axial force is applied to the first set of plates through the rocker and causes the rocker to rotate in a second rotational direction about the pivot opposing the first rotational direction.

6. The device of claim 5, further comprising:
  a bearing positioned between the second member and the rocker so that the second force is applied to the rocker through the bearing.

7. The device of claim 6, further comprising:
  a first generally annular member positioned between the second member and the bearing and configured to slide axially with respect to the output member; and
  a second generally annular member positioned between the bearing and the rocker and configured to slide axially with respect to the input member.

8. The device of claim 5, wherein a difference in magnitude of the first and second axial forces causes engagement of the first set of plates with the second set of plates with a torque capacity that increases as the difference in magnitude increases.

9. The device of claim 5, wherein the first member is configured so that the first axial force is greater than the second axial force when the input member and the output member are rotating at the same speed, torque thereby being transferred between the input member and the output member.

10. A device for controlling torque transfer between an input member and an output member comprising:
  a first set of plates connected for rotation with the input member;
  a second set of plates connected for rotation with the output member;
  a first member pivotally connected for rotation with the input member and configured with a first mass so that the first member applies a first axial force on the first set of plates to engage the first set of plates with the second set of plates as radially-outward force pivots the first member to move the first mass when the input member rotates, the first axial force increasing as the rotational speed of the input member increases;

a second member pivotally connected for rotation with the output member and configured with a second mass so that the second member applies a second axial force as a radially-outward force pivots the second arm to move the second mass when the output member rotates, the second axial force increasing as the rotational speed of the output member increases;

a rocker connected at a pivot to one of the input member and the output member adjacent the first set of plates; wherein the first axial force is applied to the first set of plates through the rocker and causes the rocker to rotate in a first rotational direction about the pivot;

wherein the second axial force is applied to the first set of plates through the rocker and causes the rocker to rotate in a second rotational direction about the pivot opposing the first rotational direction;

a bearing positioned between the second member and the rocker so that the second axial force is applied to the rocker through the bearing; and wherein a difference in magnitude of the first and second axial forces causes engagement of the first set of plates with the second set of plates with a torque capacity that increases as the difference in magnitude increases.

* * * * *